July 31, 1962 W. H. BUCK 3,047,015
TURRET VALVE
Filed Sept. 21, 1959
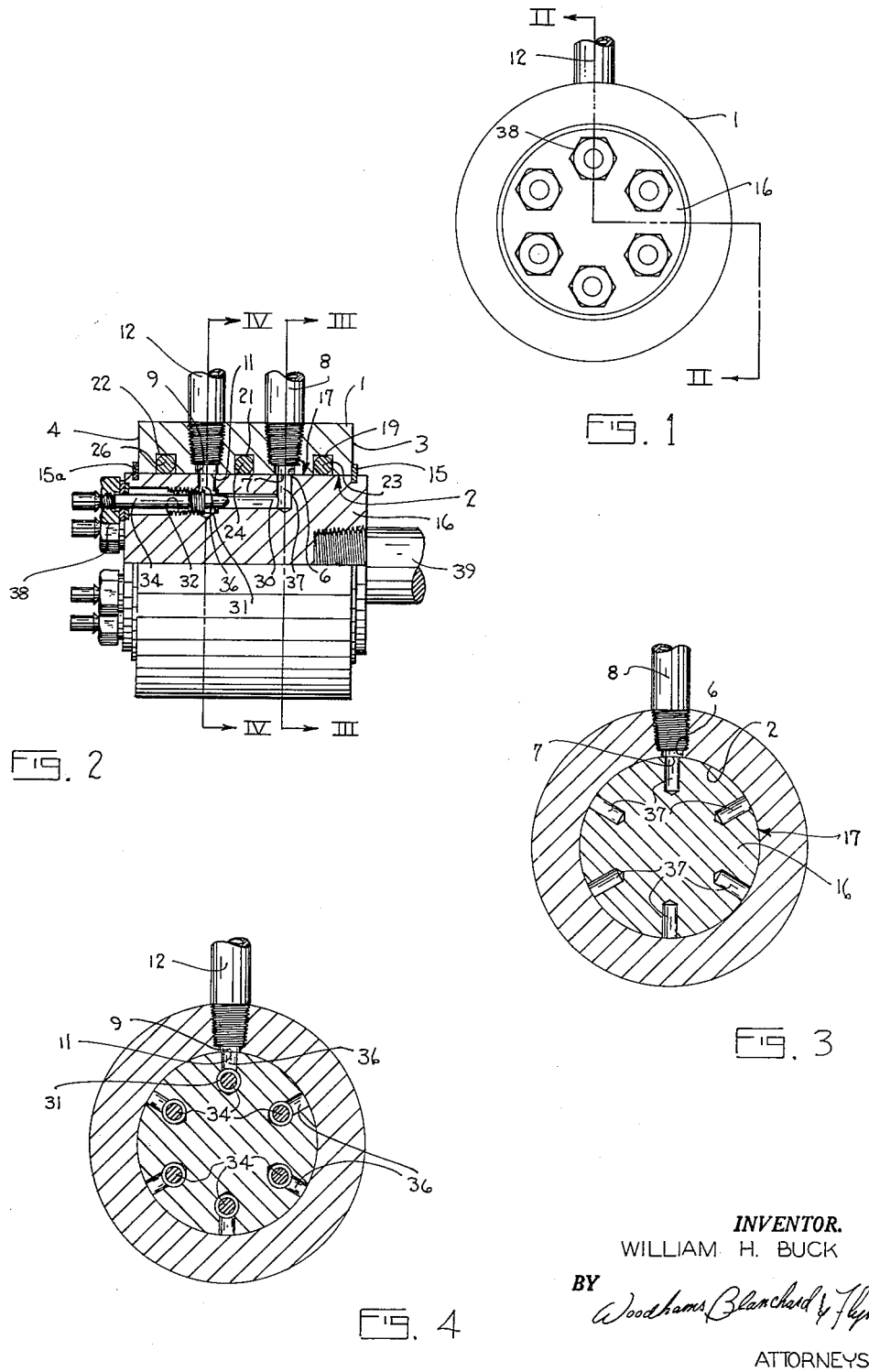
INVENTOR.
WILLIAM H. BUCK
BY Woodhams, Blanchard & Flynn
ATTORNEYS 3,047,015
Patented July 31, 1962

1

3,047,015
TURRET VALVE
William H. Buck, Portage Township, Kalamazoo County, Mich., assignor to Atlas Press Company, Kalamazoo, Mich., a corporation of Michigan
Filed Sept. 21, 1959, Ser. No. 841,222
2 Claims. (Cl. 137—614.17)

This invention relates to a flow-selecting valve structure and particularly to a type thereof having a plurality of fluid paths each of which includes an on-off valve and an adjustable valve serially arranged with respect to each other.

Inasmuch as the valve embodying the present invention was developed in answer to a need in machine tool operations, and the preferred embodiment of the invention hereinafter described is particularly applicable to machine tool operations, the invention will be discussed and set forth in terms of a valve utilized for machine tool operations. However, it will be readily recognized that the valve is applicable to a wide variety of other uses and accordingly the reference hereinafter to the use of such valve in and with respect to machine tool operations will be understood as illustrative only and not as limiting.

In a wide number of automated machine tool operations it is often necessary to provide a flow of pressure fluid at varying rates in association with different positions of the machine tool part. For example, in a turret lathe it is often necessary to feed the work at different rates toward different tools which may be presented on and by different positions of the tool-supporting turret.

In such operations, continuing the reference to machine tool operations by way of example, it is evident that the work-feeding mechanism must have a high degree of accuracy for otherwise if the work is fed at the wrong speed, it is entirely possible, and often probable, that a piece of work on which a great deal of labor has already been expended will be completely ruined. On the other hand, in the interest of holding at a minimum both the original cost of such machines and their subsequent maintenance in good operating condition, it is desirable that the controlling mechanism be as simple structurally as possible.

Many devices have been developed for the purpose of controlling the speed at which work is fed to successive tools on a lathe turret, but insofar as I am aware these devices have all been relatively complex. Particularly, many such devices have been largely mechanical in nature and these require a large number of adjustable mechanical parts, all of which involve both expense in their original manufacture and expense in their maintenance. While some attempts have been made to effect hydraulic control for such apparatus, such has also been relatively complex and correspondingly expensive in both the original manufacture and subsequent maintenance, due to the relatively complex valve structures which have previously been used.

This complexity has arisen from the fact that the stream of fluid introduced into the work-feeding cylinder must not only be turned on and off to move the work toward and away from the tools in synchronism with the presentation of a given tool toward the work but in addition the volume of liquid supplied to the work-feeding cylinder must be varied from one turret position to another in order that the work will move toward a given tool (or a given tool move toward the work) at the proper feeding rate. This has in the past resulted in a relatively complex valve structure often involving a number of valves together with relatively complex mechanical operating means responsive to movement of the turret for operating said several valves.

Accordingly, the objects of the invention are:

2

(1) To provide a highly simplified flow-selecting valve structure for providing in a fluid path an on-off valve and multiple volume adjusting valves.

(2) To provide a valve structure, as aforesaid, wherein the several volume-adjusting valves can be readily adjusted from time to time as desired for a given application.

(3) To provide a valve, as aforesaid, having a single inlet conduit and a single outlet conduit.

(4) To provide a valve structure, as aforesaid, having only a single moving part effecting the on-off function.

(5) To provide a valve, as aforesaid, having no critical parts which are subject to appreciable wear and wherein the volume-adjusting parts are in the normal operation and use of the apparatus adjustable to compensate for wear.

(6) To provide a valve, as aforesaid, wherein the only parts which are subject to such wear as is not normally compensated for in the ordinary operation of the apparatus, such as the adjustment devices, are readily protectable by easily replaceable resilient means, such as O-rings.

(7) To provide a valve, as aforesaid, wherein the means connecting the single conduit to a selected one of a plurality of conduits does so by a rotary motion whereby a series of selected connections can be accomplished by step-wise rotational movement of a driving shaft.

Other objects and purposes of the invention will be apparent to persons acquainted with devices of this general type upon reading the following disclosure and inspection of the accompanying drawings.

In the drawings:

FIGURE 1 represents an end view of the apparatus having six selectable passageways between the inlet and outlet ports and showing the adjustment devices respectively associated with each of said passageways.

FIGURE 2 is a partially sectional and partially elevational view taken on the line II—II of FIGURE 1.

FIGURE 3 is a sectional view taken on the line III—III of FIGURE 2.

FIGURE 4 is a sectional view taken on the line IV—IV of FIGURE 2.

*General Description*

In general, the invention consists of providing a casing with a core structure rotatable therein. A series of U-shaped passageways are arranged within said core, the bight of each U being substantially parallel with the axis of said core and the arms of each U extending radially outward therefrom. A screw adjustable needle-type valve is provided at the corner between the bight and one arm of each U-shaped passageway. One group of radially positioned portions of said U-shaped passageways are operatively associated with the inlet and the other group of radially arranged portions of said U-shaped passageways are associated with the outlet of said casing.

*Detailed Description*

The preferred embodiment of the invention herein chosen for illustrative purposes, comprises a casing 1 having a cylindrical inner surface 2 and generally radially arranged ends 3 and 4. In this embodiment, one end of the valving operation which for illustrative purposes will be assumed to be the inlet end thereof, constitutes an inlet opening 6 communicating through the inner surface 2 by the inlet port 7. An inlet conduit 8 will normally be associated in any convenient manner, as by suitable threading, with the opening 6.

An outlet opening 9 is in this embodiment axially aligned with the inlet 6 and opens through the inner surface 2 by an outlet port 11. A suitable conduit 12 will normally be associated with the opening 9 by any convenient means, such as by threading.

A core 16 having an outer cylindrical bearing surface 17 is snugly and rotatably fitted into said casing in close but easily rotatable engagement with the inner surface 2 and is held in place in any convenient manner, such as by the snap rings 15 and 15a. Suitable O-rings are provided in any convenient manner between the casing and the core and on either side of said inlet port 7 and said outlet port 11. In this embodiment, grooves 19, 21 and 22 are provided in the inner surface of said casing and the O-rings 23, 24 and 26 are respectively located therein. Said O-rings are all of such size that they all snugly engage the adjacent portions of the surface of said core.

A plurality of radially arranged U-shaped passageways are provided in said core, the bight 30 of each of said passageways being in this embodiment aligned substantially parallel with the axis of said core. One set of passageways corresponding to the rightward arm of said U, here the inlet passageways 37 appearing at the rightward side as same appears in FIGURE 2, are arranged in axial alignment with said inlet port 7 and for one-at-a-time registry with said port as said core rotates with respect to the casing. The leftward arm 36 of said U-shaped passageway is axially aligned with the outlet port 11 and each of said several last-named arms of said several U-shaped passageways are registrable with said outlet port 11 in one-at-a-time sequence as said core is rotated. At the leftward end of each of said bight passageways 30 there is provided a valve seat 31. Coaxial with each of said bight passageways 30 is a threaded opening 32 in which is threadedly arranged a needle valve core 34, the rightward end of said needle valve being tapered in the usual manner and arranged in operative association with said valve seat 31. Thus, rotation of said needle valve 34 will move said tapered end toward and away from said valve seat 31 and thereby vary the available area for passage of fluid from the bight portion 30 of U-shaped passageway to the leftward arm 36 of said U-shaped passageway.

Each inlet passageway 37 of the core is circumferentially arranged with respect to its respectively connected outlet passageway 36 so that said inlet core passageway 37 will be in registry with said inlet port 7 at the same time said outlet core passageway 36 is in registry with the outlet port 11. In this embodiment, as shown in the drawings, a given U-shaped core passageway as well as the inlet and outlet ports through the casing are all arranged so that their respective axes lie in a radial plane including the axis of said core. However, said inlet and said outlet ports, together with the core passageways registrable therewith, may be arranged in other patterns, such as on a spiral if desired to meet particular operating requirements.

Suitable locking mechanism, such as the lock nuts 38 will be provided for holding the stems 34 in adjusted position as desired.

*Operation*

The operation of the apparatus has already been somewhat indicated in connection with the description of its structure but it will be reviewed further in the interest of insuring a complete understanding of the invention.

In the position of the apparatus shown in the drawings, a fluid, such as a hydraulic liquid, will be introduced into one of the conduits 8 or 12, preferably the conduit 8, will pass through the inlet port 7 into the passageway 37, through the passageway 30 to adjustable valve 34, thence through the outlet port 11 to the other of the conduits 8 or 12.

Rotation of the valve core 16 in any convenient manner, as by the shaft 39 will present successive ones of the U-shaped passageway to the inlet and outlet ports 7 and 11 and thereby position different ones of the adjustable valves between said inlet and outlet ports. This permits different quantities of fluid flow as desired between the conduits 8 and 12. Thus, when the valve is being used in the supply of a hydraulic feed for feeding workpieces to the tools carried on the tool-carrying turret, and the shaft is mechanically synchronized with the rotation of said turret, there will be obtained an extremely accurate and reliable control over the feeding rate of work in coordination with selected positions of the turret.

Adjustment of the individual stems 34 will create a rate of flow corresponding to each position of the core 16 as desired.

While particular preferred embodiments of the invention have been described hereinabove, the invention contemplates such modifications or changes therein as lie within the scope of the appended claims.

What is claimed is:

1. A control valve, comprising: a casing having a cylindrical internal opening and having an inlet port and an outlet port which are axially aligned and which extend substantially radially from said opening at axially spaced points therealong; a rotatable, cylindrical core rotatably and snugly arranged within said internal opening; retaining rings seated in said core and engaging the axial ends of said casing and holding said core against axial movement with respect to said casing; O-ring means within said casing encircling and sealingly contacting said core and located between said inlet and outlet ports and between said ports and the ends of said casing for preventing flow of fluid along the external surface of said core; means defining a plurality of circumferentially spaced passageways in said core, each passageway consisting of a pair of axially spaced, radially extending arm portions spaced apart the same distance as and adapted to simultaneously register with said inlet and outlet ports, each passageway also including an axially extending bight portion connecting the inner ends of said arm portions, said bight portion having a valve seat on one end thereof; means defining an axially extending, threaded opening for each passageway, which opening is of larger diameter than the bight portion of its associated passageway and which is axially aligned therewith and which extends from the valve seat at the juncture of an arm and the bight of said passageway through one end of said core; a needle valve core having a threaded portion threaded into each opening and having a tapered end of smaller diameter than said threaded portion and disposed in opposition to the associated valve seat for limiting flow of fluid through said bight, said needle valve core extending through and beyond said one end of said cylindrical core whereby the position of the tapered end thereof with respect to said valve seat may be adjusted; lock nut means for holding said needle valve core in axially nonmovable position within said opening, and means secured to the other end of said cylindrical core for rotating same with respect to said casing.

2. A control valve, comprising: a casing having a cylindrical internal opening and having an inlet port and an outlet port which are aligned axially of the casing and which extend substantially radially from said opening at axially spaced points therealong; a rotatable, cylindrical core rotatably and snugly arranged within said internal opening, and retaining means associated with the axial ends of said casing for holding said core against relative axial movement; sealing means within said casing encircling and sealingly contacting said core and located between said inlet and outlet ports and between said ports and the ends of said casing for preventing flow of fluid along the external surface of said core; means defining a plurality of circumferentially spaced passageways in said core, each passageway consisting of a pair of axially spaced, radially extending arm portions spaced apart substantially the same distance as, and adapted to simultaneously register with, said inlet and outlet ports, each passageway including an axially extending bight portion connecting the inner ends of said arm portions, each bight portion having a valve seat at one end thereof; means defining an axially extending, threaded opening for each passageway, which opening is of larger diameter than the valve seat of its associated passageway and which is axially aligned therewith and which extends away from the valve seat and from the bight of said passageway through one end of said core; a needle valve core having a threaded portion threaded into each opening and having an end of smaller diameter than said threaded portion and engageable with the valve seat for limiting flow of fluid through said bight, said needle valve core extending through and beyond said one end of said cylindrical core whereby the position of said end thereof with respect to said valve seat may be adjusted; lock means for holding said needle valve core in a fixed position with respect to said core; and means secured to the other end of said cylindrical core for rotating same with respect to said casing.

References Cited in the file of this patent

UNITED STATES PATENTS

| | | |
|---|---|---|
| Re. 24,102 | Ohls | Dec. 13, 1955 |
| 1,384,645 | Sullivan | July 12, 1921 |
| 1,498,477 | Nichles | June 17, 1924 |
| 2,510,514 | Mueller | June 6, 1950 |
| 2,626,160 | Brumbaugh | Jan. 20, 1953 |
| 2,912,011 | Burg | Nov. 10, 1959 |